Feb. 3, 1959 G. W. WHARTMAN ET AL 2,872,242
INSECT DEFLECTOR ATTACHMENT FOR MOTOR VEHICLES
Filed Aug. 2, 1957 2 Sheets-Sheet 1

Gerald W. Whartman
Fay W. Hylland
    INVENTORS.

BY
    Attorneys

Feb. 3, 1959  G. W. WHARTMAN ET AL  2,872,242
INSECT DEFLECTOR ATTACHMENT FOR MOTOR VEHICLES
Filed Aug. 2, 1957  2 Sheets-Sheet 2
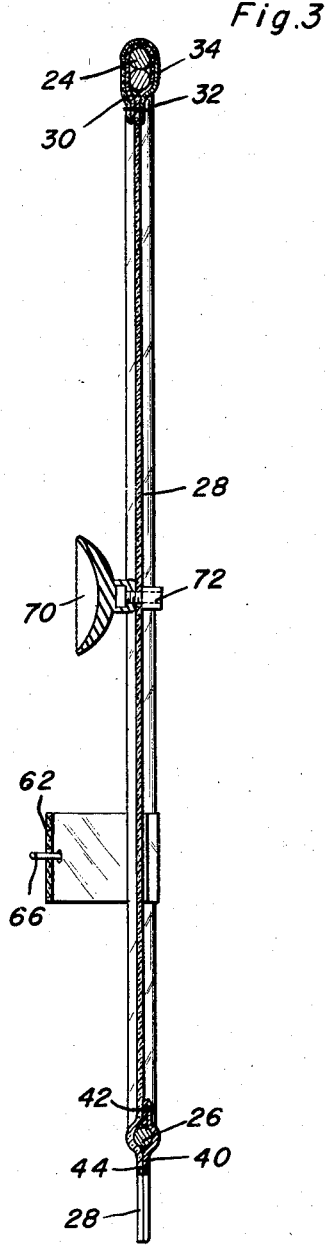
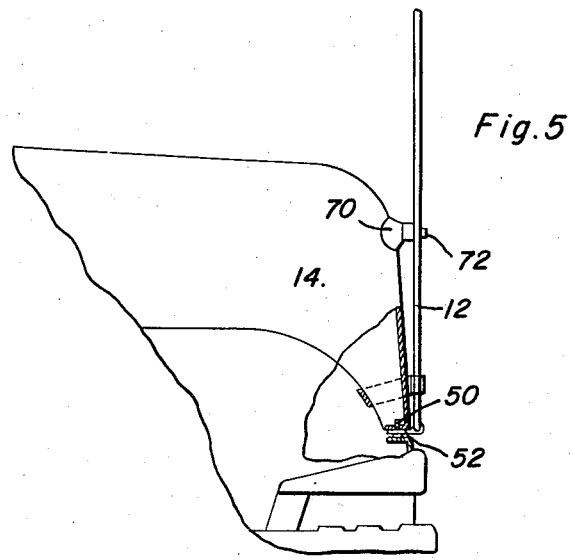
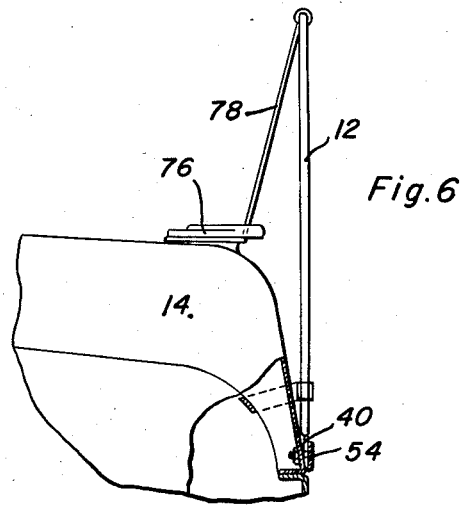
Gerald W. Whartman
Fay W. Hylland
INVENTORS, __United States Patent Office__ 2,872,242
Patented Feb. 3, 1959

2,872,242

INSECT DEFLECTOR ATTACHMENT FOR MOTOR VEHICLES

Gerald W. Whartman and Fay W. Hylland, Mitchell, S. Dak.

Application August 2, 1957, Serial No. 675,873

4 Claims. (Cl. 296—91)

This invention relates to an attachement for a motor vehicle and more particularly to an insect and gravel deflector adapted to be mounted on the hood of a vehicle.

The primary object of the present invention resides in the provision of an insect and gravel deflector which is securely fastened in a novel manner on the hood of a vehicle and stays in one position without shifting from side to side even at high speed.

A further object of the present invention resides in the provision of an insect and bug deflector that is simple in construction, not bulky, and has a highly attractive and pleasing appearance.

In use, the present invention will deflect gravel and insects so that the gravel will not damage hood or windshield and the bugs, even when the vehicle is travelling at a high speed, will not disturb vision.

The concept of the present invention lies in the provision of a frame which may be made out of any suitable material such as metal or the like which has a sheet of flexible material which is plastic and which is sewn about the frame so as to prevent the frame from rubbing against the paint of the car and thus by metal to metal contact causing paint damage and noise while the frame is also insulated against deleterious action on the paint and metal from the vital fluids of the insects thereby assuring that the deflector comprising the present invention will retain its pleasing appearance even after long and hard usage since it is extremely durable.

Further object of the present invention resides in the provision of a bug and gravel deflector which protects the entire front of the hood and actually rises well above the rood so as to insure that the whole hood is completely protected as is the windshield.

These, together with the various ancillary objects and features of the invention which will become apparent as the following description proceeds, are attained by this motor vehicle insect deflector, preferred embodiments of which have been illustrated in the accompanying drawings, by way of example only, wherein:

Figure 3 is a vertical sectional view on an enlarged scale as taken along the plane of line 3—3 in Figure 2;

Figure 5 is a sectional detail view through a portion of the hood illustrating one manner of attachment of the deflector to the vehicle; and Figure 6 is a view similar to that of Figure 5 but showing another manner of attachement of the device to other types of vehicles.

Figure 1:
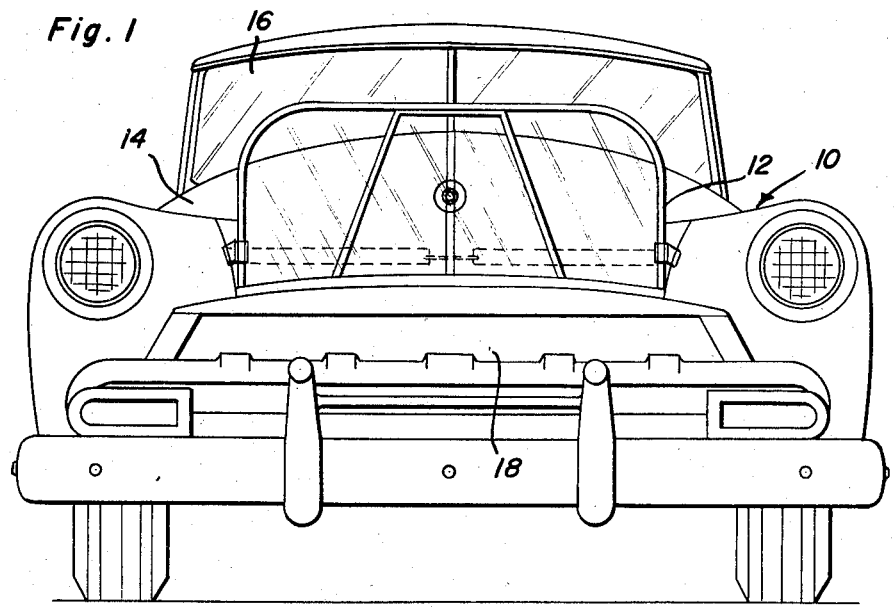
Figure 1 is a front elevational view of a vehicle having the deflector comprising the present invention installed thereon.
Figure 2:
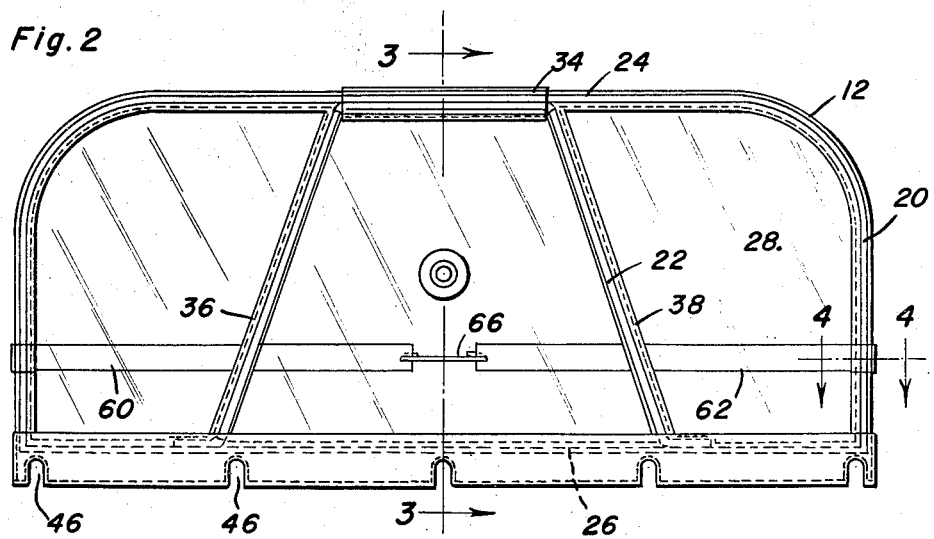
Figure 2 is an elevational view of the hood.
Figure 4:
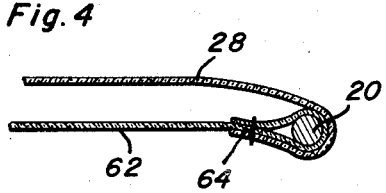
Figure 4 is an enlarged sectional detail view as taken along the plane of line 4—4 in Figure 2 illustrating the manner in which one of the straps is attached to frame.

With continuing reference to the accompanying drawings wherein like reference numerals designate similar parts throughout the various views, reference numeral 10 generally designates a conventional automotive vehicle employing the deflector indicated at 12 which comprises the present invention when used in combination with the vehicle 10. The vehicle 10 is provided with a hood 14, a windshield 16, and an air intake grill 18.

The bug deflector comprising the present invention includes a peripheral frame 20 formed of metal or other suitable material and provided with an inverted U-shaped brace as at 22 between the top and bottom portions 24 and 26. The peripheral frame may be of any suitable size and shape to provide a highly attractive exterior configuration and apperance to the insect and gravel deflector.

A sheet of resilient plastic 28 which is transparent, comparatively tough, somewhat resilient and flexible is secured to the frame 20.

The frame 20 is completely encased in the plastic material 28 inasmuch as portions thereof as at 30 are folded so as to encompass the frame 24 and encase it within the plastic material. Stitches 32 are provided and thus the frame is entirely sewn within the sheet 28. At the portions of the invention where the reinforcing member 22 abuts the frame, a reinforcing layer 34 overlies the frame and the reinforcing member 22. Further, strips as at 36 and 38 of plastic material similar to that of which the sheet is constructed are sewn to the sheet 28 so as to encase the reinforcing member 22. It is noted that inasmuch as the reinforcing member 22 and the frame 20 is encased in the synthetic plastic material, it is protected from the corrosive effects of the vital fluids of the insects which may impinge against the deflector and furthermore the frame and reinforcing member will not rub against the paint work of the vehicle in metal to metal contact to cause either unwanted noise or wearing of the paint of the vehicle.

Sewn to the sheet 28 and depending therefrom and coextensive therewith it a skirt 40 of suitable material such as synthetic plastics, or the like. This member is sewn by means of stitches as at 42 and 44 to the plastic material of the sheet 28 and depends below the lower portion 26 of the frame 20. The skirt is provided with suitable recesses as at 46 for accommodating the body bolts of a particular vehicle. In mounting the device on a vehicle, screws or other fasteners as at 50 may be employed to secure the skirt to the underside of the hood indicated at 52. Those forms of the the invention where the hood is provided with a chrome strip 54, the skirt 40 may be positioned between the chrome strip 54 and the hood 14.

Straps as are indicated at 60 and 62 are stitched to the sheet 28 and are secured about the frame 20 as at 64. These straps may be fastened in any suitable manner by a suitable fastener 66, staples, or the like in the manner as best seen in Figures 5 and 6 with the strips 60 and 62 engaging the hood holding the deflector in position. In the form of the invention as is shown in Figure 5, when the vehicle is provided without any protruding hood ornament or the like, a suction cup 70 may be secured by suitable fasteners 72 to the sheet 28 and is adapted to be engaged with the hood 14. Alternatively, when one or more hood ornaments 76 are provided for the hood 14, wire brackets 78 or the like are used to fasten the frame to the hood ornament 76. If desired, both brace means 70 and 78 could be employed simultaneously since they brace different portions of the screen and the suction cup would inherently minimize flexing of the screen.

It is to be noted that this hood does not need to be removed from the vehicle when it is desired to wash the vehicle due to the fact that the device is extremely weatherproof and corrosive resistant. Furthermore, when the hood is lifted, the device will readily lift therewith and is light in weight.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motor vehicle insect deflector for use on a vehicle having a windshield and a hood overlying an air intake grill, said deflector including a peripheral frame, a transparent sheet secured to said peripheral frame, a flexible skirt secured to said peripheral frame and depending therefrom, said skirt being secured to the lower part of said hood, and a pair of stabilizer straps secured to said peripheral frame above said flexible skirt, said straps extending under said hood, said sheet being folded over said frame, and stitching through said sheet holding said sheet about said frame encasing said frame.

2. A motor vehicle insect deflector for use on a vehicle having a windshield and a hood overlying an air intake grill, said deflector including a peripheral frame, a transparent sheet secured to said peripheral frame, a flexible skirt secured to said peripheral frame and depending therefrom, said skirt being secured to the lower part of said hood, and a pair of stabilizer straps secured to said peripheral frame above said flexible skirt, said straps extending under said hood, said sheet being folded over said frame, and stitching through said sheet holding said sheet about said frame encasing said frame, reinforcing means secured to said frame rigidifying said frame, said hood having at least one ornament thereon, and a wire bracket secured to said frame engaging said ornament.

3. A motor vehicle insect deflector for use on a vehicle having a windshield and a hood overlying an air intake grill, said deflector including a peripheral frame, a transparent sheet secured to said peripheral frame, a flexible skirt secured to said peripheral frame and depending therefrom, said skirt being secured to the lower part of said hood, and a pair of stabilizer straps secured to said peripheral frame above said flexible skirt, said straps extending under said hood, said sheet being folded over said frame, and stitching through said sheet holding said sheet about said frame encasing said frame, and a suction cup secured to said sheet engageable with said hood.

4. A motor vehicle insect deflector for use on a vehicle, said deflector comprising a peripheral substantially rectangular metal frame, support members on said frame for further rigidifying the latter, a soft, flexible covering disposed about portions of said frame and said support members whereby no metal parts are exposed, a transparent sheet secured to said frame and further stabilized by said support members, a flexible skirt secured to said peripheral frame and depending therefrom, means on said skirt for attachment to the lower part of a vehicle hood, a pair of stabilizer straps secured to said peripheral frame above said flexible skirt, said straps extending under the hood, said sheet being folded over said frame, stitching through said sheet holding said sheet about said frame encasing said frame, a suction cup secured to said sheet engageable with said hood, and a wire bracket secured to said frame for engaging a hood ornament.

References Cited in the file of this patent

UNITED STATES PATENTS

| | | |
|---|---|---|
| 1,020,336 | White | Mar. 12, 1912 |
| 2,034,493 | Sonnenberg | Mar. 17, 1936 |
| 2,065,242 | Omerly | Dec. 22, 1936 |
| 2,119,072 | Cohen | May 31, 1938 |
| 2,193,469 | Ashton | Mar. 12, 1940 |
| 2,638,376 | Berry | May 12, 1953 |
| 2,726,727 | Abramson | Dec. 13, 1955 |